US006759962B2

(12) United States Patent
Severson et al.

(10) Patent No.: US 6,759,962 B2
(45) Date of Patent: Jul. 6, 2004

(54) INFLIGHT ICE DETECTOR TO DISTINGUISH SUPERCOOLED LARGE DROPLET (SLD) ICING

(75) Inventors: John A. Severson, Eagan, MN (US); Bruce B. Chenoweth, Eagan, MN (US); Robert D. Rutkiewicz, Edina, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 326 days.

(21) Appl. No.: 09/946,068

(22) Filed: Sep. 4, 2001

(65) Prior Publication Data
US 2002/0158768 A1 Oct. 31, 2002

Related U.S. Application Data
(60) Provisional application No. 60/286,775, filed on Apr. 25, 2001.

(51) Int. Cl.[7] .............................................. G08B 19/02
(52) U.S. Cl. ...................... 340/580; 340/582; 340/962; 73/170.26
(58) Field of Search ................................ 340/580, 582, 340/962; 73/170.26, 24.01, 24.04, 29.01, 29.02, 335.02, 29.05

(56) References Cited

U.S. PATENT DOCUMENTS

| 3,057,198 | A |   | 10/1962 | Crouchman ................. 73/170 |
|-----------|---|---|---------|-----------------------------------|
| 3,940,622 | A |   | 2/1976  | Stallabrass et al. ......... 250/338 |
| 3,952,972 | A |   | 4/1976  | Tedstone et al. .............. 244/53 |
| 4,210,021 | A |   | 7/1980  | Vykhodtsev et al. ...... 73/170 R |
| 4,441,363 | A |   | 4/1984  | Hill et al. ................. 73/170 R |
| 5,313,202 | A |   | 5/1994  | Hansman, Jr. et al. ...... 340/962 |
| 5,398,547 | A | * | 3/1995  | Gerardi et al. ........... 73/170.26 |
| 5,641,972 | A |   | 6/1997  | Breda ......................... 250/573 |
| 5,760,711 | A |   | 6/1998  | Burns ......................... 340/962 |
| 6,269,320 | B1|   | 7/2001  | Auto .......................... 702/127 |
| 6,560,551 | B1| * | 5/2003  | Severson et al. ............. 702/54 |

FOREIGN PATENT DOCUMENTS

| GB |       2 116 929 A | 10/1983 |
|----|-------------------|---------|
| WO | WO 01 11582 A     | 2/2001  |

* cited by examiner

Primary Examiner—Daryl Pope
(74) Attorney, Agent, or Firm—Westman, Champlin & Kelly, P.A.

(57) ABSTRACT

An ice detector has a pair of probes, each of which is used for determining the accretion of ice thereon. One of the probes in the assembly is configured so the smaller droplets of supercooooled water are inertially separated and flow away from the one probe. The ice accretion on the one probe is primarily from large (50 microns or greater) supercooled droplets. The ice accreting on the one probe is therefore biased to supercooled large droplets. The probes are connected to detection circuitry that will determine the ratio of the rates of icing between the probes so the presence of supercooled large droplets can be determined. In one form, a flow guide is arranged to create an airflow that carries smaller droplets past one of the probes without impinging on the probe, but the higher inertia, supercooled large droplets will impinge on that one probe.

35 Claims, 5 Drawing Sheets

INFLIGHT ICE DETECTOR TO DISTINGUISH SUPERCOOLED LARGE DROPLET (SLD) ICING

CROSS REFERENCE TO RELATED APPLICATION

This application claims priority on provisional application Serial No. 60/286,775, filed Apr. 25, 2001 for INFLIGHT ICE DETECTOR TO DISTINGUISH SUPERCOOLED LARGE DROPLET (SLD) ICING.

BACKGROUND OF THE INVENTION

The present invention relates to ice detectors, which detect the presence of supercooled large droplets, as opposed to normally encountered icing conditions with smaller droplets. In many cases aircraft ice protection systems are not designed to deal with supercooled large droplets.

Various ice detectors have been advanced in the prior art, and generally include a probe that is vibrated at a resonant frequency, and which has circuitry that senses changes in frequency due to accretion of ice on the probe.

These ice detectors work well, but cannot distinguish supercooled large droplet icing encounters from smaller droplet icing encounters. For smaller aircraft in particular, which may have deicing boots or other ice protection devices on leading edges of airfoils, supercooled large droplets will tend to accrete on surfaces that are aft of the boots, to a point where control surfaces may be affected. Since the accretion of the ice cannot be removed by the deicing boots, control surfaces that are affected may potentially become inoperable or ineffective, resulting in loss of control of the aircraft. The present invention operates to detect both normal, small droplet icing conditions, as well as the supercooled large droplet conditions such that the two conditions can be distinguished. Aircraft crews can thus be made aware of supercooled large droplet icing conditions so they can take the special actions that these conditions may require.

SUMMARY OF THE INVENTION

The present invention comprises an ice detector that will sense the presence of supercooled large droplets (SLD), in order to provide a warning that supercooled large droplet icing conditions are present. Supercooled large droplet icing may uniquely affect the operability of the aircraft. The ice detector is formed with two probes, one of which is constructed and mounted so that it will be affected primarily by supercooled large droplets, which may cause unique icing when encountered, that is, a build-up of ice where it cannot be removed by the aircraft's ice protection system, while the other one of the probes will collect all sizes of droplets. By determining the ratio of icing rates of the two different probes, the presence of supercooled large droplets, that are primarily causing ice build-up on the one probe, can be determined.

Three forms of the ice detector of the present invention are included. One form utilizes an air dam downstream from one of the probes, and the other of the probes is a stand-alone probe with a relatively small frontal area. The air dam preferably has a wall with a radiused leading edge that is generally perpendicular to the airflow direction and the associated probe is just upstream from the leading edge wall. The frontal area of the air dam is several times that of the probe. The smaller droplets of supercooled water will tend to follow the air stream around the air dam, while the larger supercooled droplets, due to their inertia, will tend to impact the air dam surface or the ice detector probe upstream of it.

The stand alone probe, with a relatively small frontal area, will serve as an efficient collector of all water droplet sizes in the air stream, but the probe in front of the air dam will be biased to collect the larger droplets. By determining the ratio of icing rates of the two probes, which are substantially identical, the presence of supercooled large droplets can be determined.

The air dam will be heated to prevent icing on the air dam surface. The influence of the heat on the air dam will be minimal on the large droplet detector probe in front of the air dam because the airflow is moving away from the upstream detector probe and the heated air does not strike the probe.

A variation is to use two probes of different transverse dimension, that is, one is smaller than the other. In this variation, the functions of the air dam and its associated probe are essentially combined.

In a second form of the invention, a flow channel is made that has converging side walls forming a contracting section leading to a narrow section flow channel, with a first probe located upstream of a second probe. The first probe is mounted at the beginning of the narrow section or slightly upstream in the contracting section. The second probe is mounted in the narrow section, somewhat downstream of the beginning of the narrow section. It is known that the supercooled water droplets entrained in the air entering the narrow section will have different trajectories as a function of their size. The smaller droplets will essentially follow the air stream, but the larger droplets are delayed in responding to changes in airflow direction induced by the channel geometry because of relatively greater inertia. This results in a focusing or heavier concentration of large droplets a short distance downstream of the start of the narrow section of the channel, and the second probe is placed at the region where large droplets are concentrated. This location has an amplified sensitivity to supercooled large droplets. By determining the relative icing rate between the second probe and the first probe, which is located upstream of the supercooled large droplet focus area, the determination of the concentration of supercooled large droplets can be made.

The specific geometry of the flow channel and specific placement of the probes, which are substantially identical, can be optimized using computational fluid dynamics software for parameters such as the airspeed range of the aircraft and the supercooled large droplet diameter threshold desired for detection. It will be recognized by those skilled in the art that the upstream probe may also be located outside of the channel.

The walls can have heaters to prevent icing on the walls, and the converging walls leading to the narrow section of the flow channel have bleed holes similar to those in known total air temperature sensors, to bleed off heated boundary layer air and prevent heaters from influencing the ice detector probes.

In a third form of the invention, two probes of different transverse size are used. The probes are both preferably circular cylinders, but one of the probes is substantially larger in diameter or cross section than the other probe. Probes of different cross section shapes can be used and the dimensions of the probes transverse to the airflow direction and transverse to the longitudinal axis of the probes will be different.

The probes of the third form of the invention are usually mounted on struts, and are subjected to the same air stream conditions. The smaller probe, as shown, is mounted so that the majority of its surface is outside of or away from the influence of any flow disruption caused by the larger probe, which in this form, is mounted upstream from the smaller probe. The ice (droplet) collection efficiency, that is, the percentage of droplets directly upstream which impact and freeze rather than follow the airstream around the probe, for the smaller diameter probe is much higher for small supercooled droplet sizes than is the collection efficiency for the larger diameter probe. As the supercooled water droplet size increases, the collection efficiency of both probes will increase, but the collection efficiency of the larger diameter probe rises much faster. Thus, the difference in the respective ice accretion rate of the two probes will decrease as droplet size increases. Comparing the rate of ice accretion between the probes permits detecting potential supercooled large droplet conditions.

In the third form of the invention, both of the probes have similar thermodynamic properties to reduce or prevent variations in probe surface temperatures under transient environmental conditions and during warm up and cool down cycles associated with operation of probe deicing heaters. The design of the probes is such that it is desirable for each probe to have a mass and thermal capacity similar to the other probe, even though one is smaller size. For example, by making the large diameter probe thinner walled than the small diameter probe, similar mass can be achieved even with substantial differences in transverse dimensions of the probes.

In a fourth form of the invention, a pair of ice detector probes are used for indicating supercooled large droplet icing. One probe is mounted ahead of the leading end of the airfoil shaped airflow deflector, and the second probe is mounted downstream of the trailing end of the flow deflector. The ice detector probes can be of conventional design, as before, and substantially the same size. The probe ahead of the leading end presents a frontal area that serves as an efficient collector of all droplet sizes of supercooled water droplets in the airflow. Larger droplets which have higher inertia will tend to separate from the airfoil on the trailing end, and will strike the second probe or down stream probe. The airfoil shaped deflector is oriented at an angle to the airflow direction to provide the inertial separation of the larger particles which strike the second probe.

For any form of the invention, a comparison of the rate of change of frequency between the probes can be made to distinguish supercooled large droplet conditions, and the rate of change of frequency itself will indicate the severity of the icing conditions, or in other words how rapidly ice is accreting on each probe and thus, the ice accretion rate on the aircraft. Further, the overall change of frequency can be correlated to the amount of ice that has been accumulated on the probes. The ice accumulation on the probes can be correlated with ice accumulation on critical aircraft surfaces such as the wing, engine cowl, and horizontal stabilizers, through analysis, or by wind tunnel tests.

The probes of the present invention can be magnetostrictive ice detector probes using signal conditioning equipment, deicing provisions and software similar to that used with present probes, but the controller or processor used is programmed to provide the ratios of rates of icing between the probes, to determine the presence of supercooled large droplets.

The term large droplet is typically defined as a droplet that is 50 microns in diameter or greater. Droplets that are smaller than 50 microns are small droplets or generally referred to as "droplets", without using the designation "small".

Droplet populations as seen in nature, as well as those artificially generated with spray nozzles are made up of a continuum of sizes. The aggregate size of the population is typically characterized by the median droplet diameter, or MVD, which is the diameter at which half the droplets in the population are larger and half are smaller. In practice, a droplet population with an MVD greater than 50 microns is generally considered to be a supercooled large droplet condition. The invention in effect can be tuned to distinguish MVDs of 50 microns in diameter or greater, when sufficient quantities of these large droplets are present.

DETAILED DESCRIPTION OF THE PREFERRED EMBODIMENTS

Figure 1:
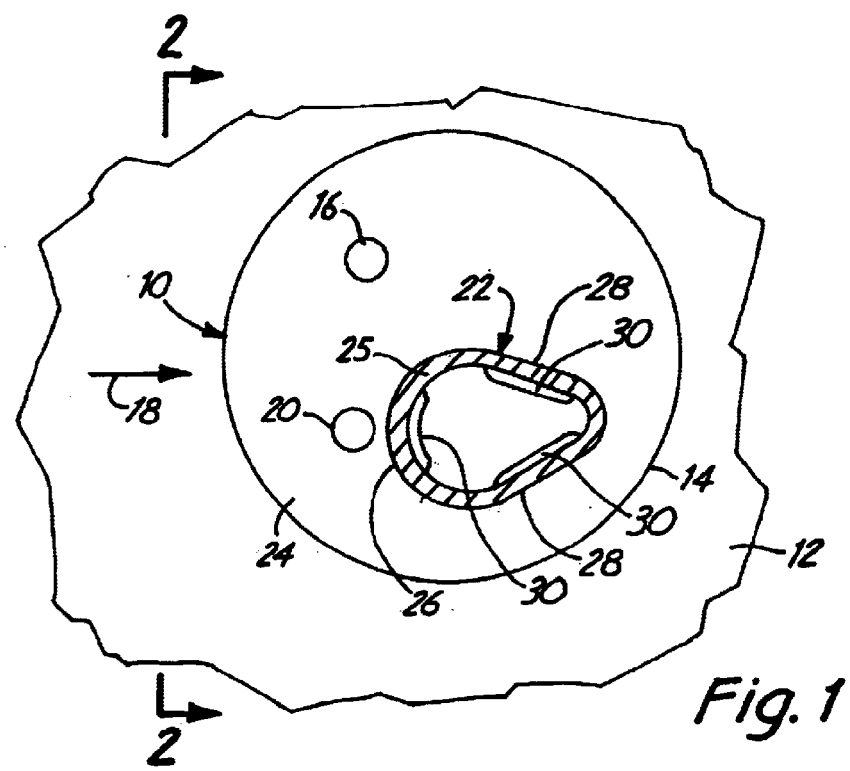
FIG. 1 is a side elevational view of an ice detector capable of differentiating the presence of supercooled large droplets made according to a first form of the present invention.
Figure 2:
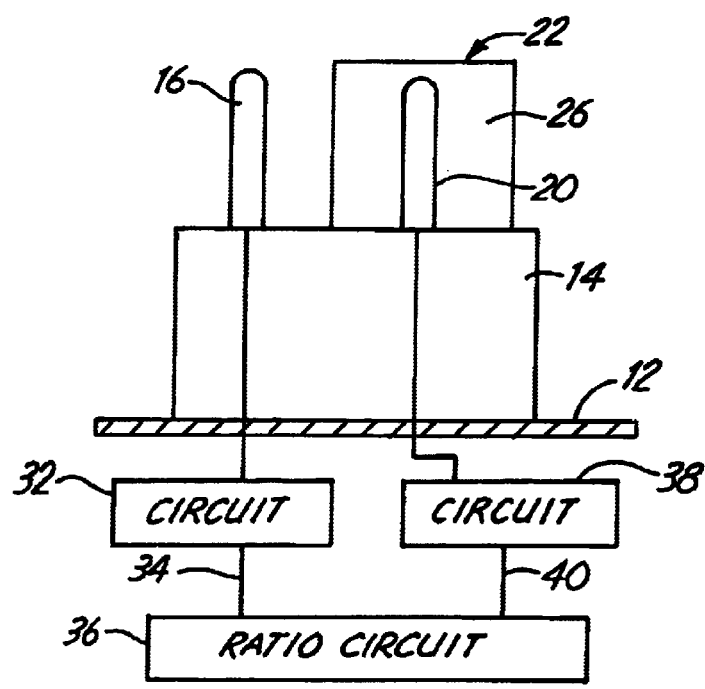
FIG. 2 is a view taken generally along line 2—2 in FIG. 1.

Referring to FIG. 1, an ice detector of the present invention is indicated generally at 10, and it is mounted onto the sidewall or skin 12 of an aircraft. The ice detector is formed with a cylindrical strut 14 that is mounted onto the aircraft. Alternatively, the strut could be of a more aerodynamically shaped cross section. The strut has a first ice detector probe 16 protruding therefrom and extending laterally into airflow, the direction of which is indicated by the arrow 18. A second ice detector probe 20 is positioned ahead of an air dam 22 that is mounted on the end plate 24 of the cylindrical strut 14. The probes 16 and 20 can be substantially the same size and length, as shown.

The air dam 22 has a radiused leading edge 25 with a front surface 26. Tapered trailing walls 28 join leading edge 25 to smooth out turbulence and aid in airflow patterns and continues surface 26 around the air dam 22. The air dam 22 can be hollow, and can include heaters indicated generally at 30 to deice the walls of the air dam. The probes 16 and 20, and strut 14 also can have deicing heaters thereon used in a conventional manner when ice has been detected.

The first probe 16 is connected to a suitable signal conditioning circuit 32, which will provide excitation to the probe to cause it to vibrate at its natural frequency, which changes when ice accretes or accumulates on the probe. As the natural frequency changes, this change in frequency is sensed by circuit 32 to indicate that ice is accumulating. The greater the accumulation, the greater the change in frequency. Circuit 32 then outputs a signal along a line 34 to a computer or other processing circuitry 36 that is used, as will be explained, for determining not only that ice is accumulating on the probe 16 but also to compare the rate of accumulation of ice, as indicated by the rate of change of frequency, with the output from a circuit 38 that is connected to the probe 20.

The circuit 38 provides the probe 20 with excitation to vibrate it at its natural frequency, and provides an output when the frequency changes because of ice accumulation on the probe. The output from the circuit 38 that indicates icing on probe 20 is along the line 40 to the processing circuit 36. The outputs on lines 34 and 40 are processed to determine the rate of change of the frequencies, which indicates the rate of ice accumulation or accretion on the probes. This rate of change or rate of ice accumulation is compared between the two probes to determine the relative rate of accumulation between the two probes.

The air dam 22 will be intercepting supercooled water droplets carried in the airflow indicated by arrow 18, and the smaller droplets in this airflow will tend to flow around the air dam 22 and the probe 20, while the larger, greater inertia droplets, which are supercooled large water droplets, will tend to impact the probe 20 or the air dam 22, rather than being carried around the air dam. The ice accreting on the probe 20 will be biased toward the supercooled large droplets, since the airflow separates to go around the air dam and the small droplets entrained will tend to be carried with the airflow.

The stand alone probe 16, or in other words the probe that is not associated or affected by the air dam 22, will provide a small frontal area that serves as an efficient collector of all droplet sizes of supercooled water in the air, and thus will ice up at a higher rate than the probe 20, which is biased to collect the supercooled large droplets.

The ratio of rates of ice accretion, between the probes will give an indication of the presence of supercooled large droplets. If there is little or no ice accreting on probe 20, while ice is indicated as present on probe 16, the droplet sizes are indicated as being relatively small. The accumulation will be greater on the probe 16 than on the probe 20. An increased ice accretion rate for probe 20 relative to probe 16 indicates an increased presence of supercooled large droplets. The positioning or spacing of the probe 20 relative to the front surface 26 of the air dam 22 provides a bias of airflow that will cause the probe to be biased to collect larger droplets.

While aircraft velocity also influences the probe accretion rate, the present device is relatively insensitive to changes in aircraft velocity, as compared to the effects of the air dam because the accretion rates of the two probes are ratioed. However, if velocity is available from another source, such as an air data computer, for input into the ice detector signal processing circuitry, ice detector accuracy can be further enhanced.

Figure 3:
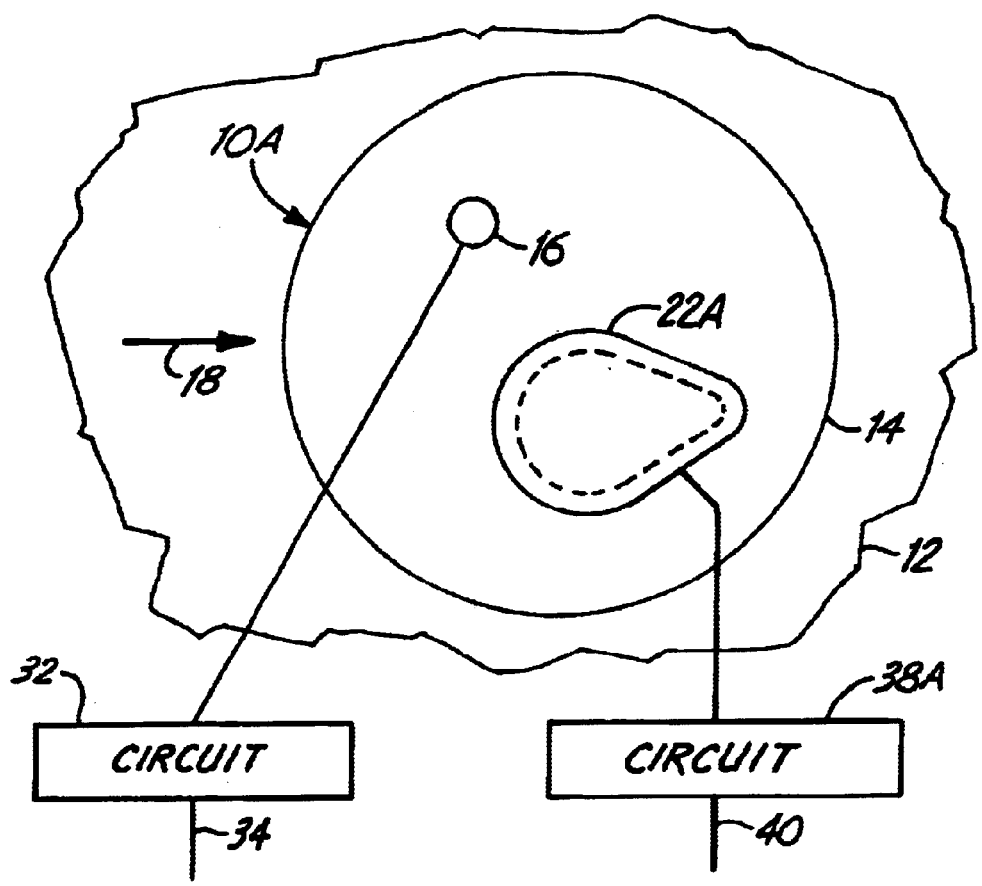
FIG. 3 is a side view similar to FIG. 1 of a modified form of the invention in which probe and air dam functions are integrated.

Another variant of the invention depicted in FIG. 1 is also recognized. In this variant 10A, shown in FIG. 3 probe 20 is eliminated and its function is integrated into an air dam acting as a probe 22A. That is, the probe 22A is a large probe that has direct ice sensing capabilities and has an excitation and sensing circuit 38A connected thereto. The probe 22A is effectively a larger version of the stand-alone probe 16, and is inertially biased to collect supercooled large droplets in place of probe 20. Processing to determine the ratio of ice accumulation rates for detecting supercooled large droplets is done in the same manner as with probe 20.

Again, the relative size difference between the two probes 16 and 22A allows discernment of supercooled large droplets due to inertia effects as reviewed previously. Also, the cross sectional shape of the probe does not have to be an airfoil, but can be a circular cylinder or other geometrical shape such as triangular, or other polygon.

The processing circuitry 36 includes software that provides indications of the presence of the supercooled large droplets, and can also provide warning signals, or similar outputs to alert a pilot to conditions that can cause icing that would not be controllable by deicing boots or similar deicing equipment, particularly on smaller aircraft.

Figure 4:
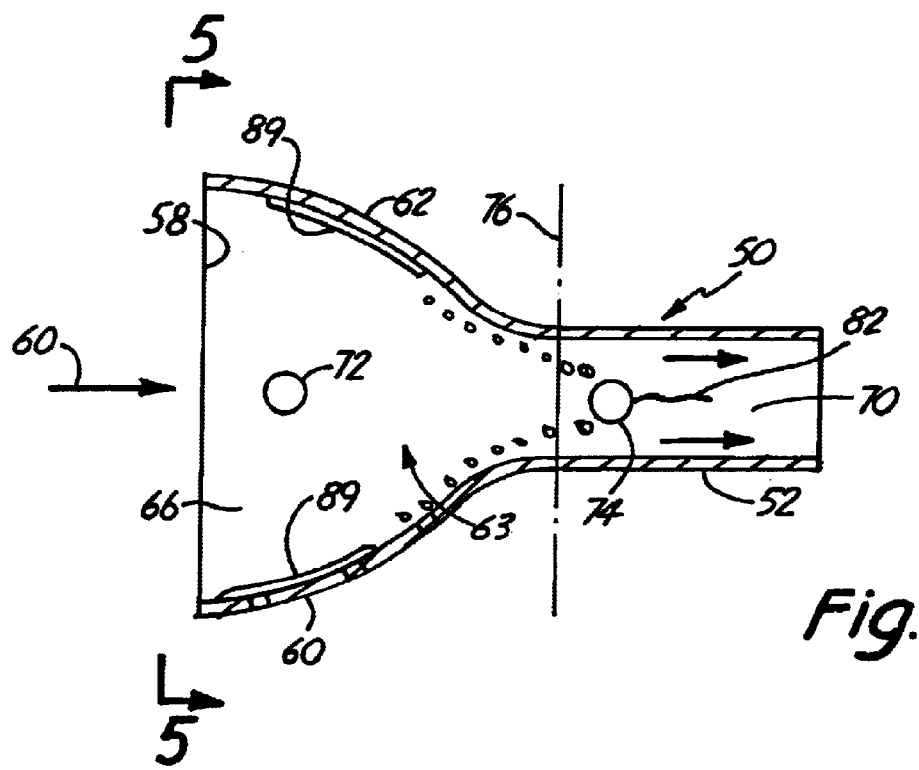
FIG. 4 is a side elevational view of a third form of the ice detector of the present invention.
Figure 5:
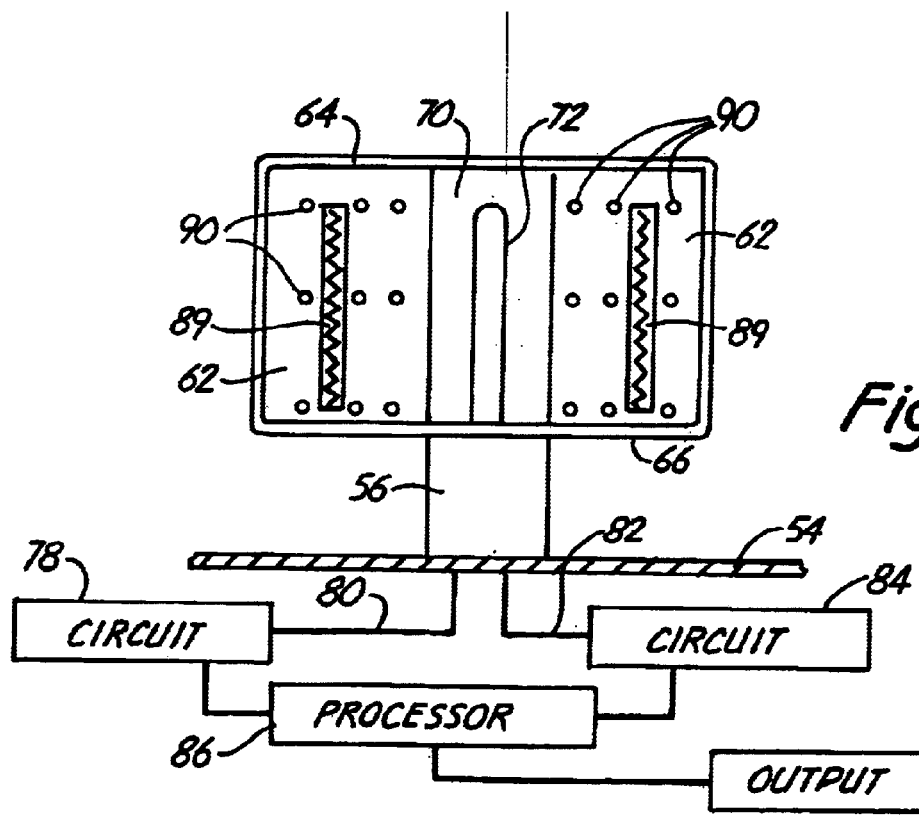
FIG. 5 is a view taken as along line 5—5 in FIG. 4.

FIGS. 4 and 5 show another form of the invention, and in this instance, an ice detector for determining the presence of supercooled large droplets made according to the present invention is indicated generally at 50, and it comprises a flow duct or channel 52 that is mounted onto an aircraft skin or wall 54 using a strut 56. The strut 56 can be airfoil shaped or other configurations that are desired, and its length can be varied as desired to minimize the effects of the aircraft wall on airflow through the duct or channel.

As shown, the duct 50 is made so that it has an inlet opening 58 of desired size and cross sectional shape, and the inlet opening is defined in the present invention as a rectangular shaped opening having sidewalls 62 converging in the direction of airflow, which is indicated by the arrow 60. The sidewalls 62 are generally tapered inwardly, and curved aft of the inlet and upstream of the narrow section of the channel to improve aerodynamics. The inlet is closed with parallel top and bottom walls 64 and 66, as shown, to form a channel inlet 63. The sidewalls 62 converge to a rectangular shaped narrow flow channel 70 which is of smaller cross sectional size than the inlet opening 58. Thus the airflow through the narrow or smaller cross section flow channel 70 will be at a greater velocity than it will at the inlet portion.

A first ice detecting probe 72 is mounted in an area upstream of maximum constriction, or in other words in the channel inlet 63 upstream of the plane indicated at 76 defining the entry of upstream end of the narrow flow channel 70. A second probe 74 is mounted downstream from the junction line or plane indicated at 76. Probe 74 is in a region slightly aft of the converging side walls in the smaller cross sectional size flow channel 70.

The probe 72 is connected to suitable processing circuitry 78, through a line 80, and the probe 74 is connected through a line 82 to processing circuitry 84. The circuitry 78 and 84 is conventionally known, to provide excitation for vibrating the probes at their natural frequencies, and then to sense the change in natural frequency as ice accumulates. The outputs from the circuits 78 and 84 are provided to a processor or computer 86 that will use the signals from the circuitry 78 and 84 to indicate when icing occurs for example on the probe 72, and when it occurs on the probe 74, and also to calculate the ratio of the rate of change of frequency and thus the ratio of the rate of ice accretion on two probes.

As was stated, the droplets that are entrained in the airflow that enters the narrow flow channel 70 have different trajectories when they move into the constricted flow channel 70, as a function of their size. The smaller droplets will follow the air stream flow lines easily, while the larger droplets are delayed in responding to changes in airflow direction induced by converging sidewalls 62 because of relatively greater inertia. This results in the larger droplets tending to be directed towards the center of the constricted flow channel 70, providing a heavier concentration of supercooled large droplets slightly downstream from the junction of the sidewalls 62 with the walls that define the constricted or narrow flow channel 70. Probe 74 is positioned at this location just downstream of the upstream end of the narrow flow channel, where the supercooled large droplets will be concentrated if they are present. Ice detector probe 74 thus is going to have an amplified sensitivity to supercooled large droplets. An increase in the relative icing rate between the probes, which is determined by the rate of change of the natural frequency of vibration due to icing, will indicate that there are supercooled large droplets in the airflow and will indicate a supercooled large droplet (SLD) icing condition.

The contracting flow channel sidewalls 62, have heaters 89 on the sides for deicing purposes, and the walls 62 also have openings or bleed holes 90 that will bleed off heated boundary layer air to prevent heating influences on the ice detector probes 72 and 74. The heaters used are conventionally controlled for ice detector use.

The current magnetostrictive ice detector signal conditioning circuits and software can be adapted to drive the probes, and by utilizing a processor computer for determining the ratio of the rate of change of the icing on the probes, an output can be provided that will indicate or annunciate supercooled large droplet conditions.

Figure 6:
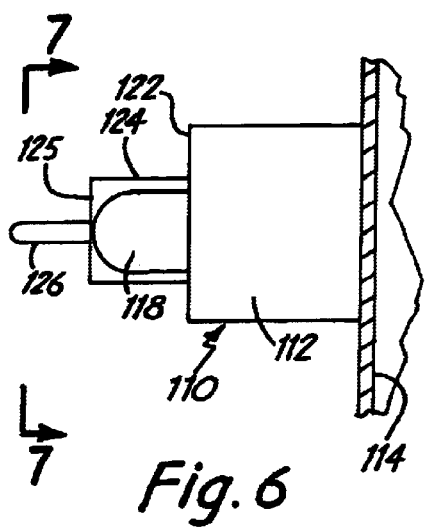
FIG. 6 is a front view of an ice detector made to another form of the present invention installed on the side of an aircraft.
Figure 7:
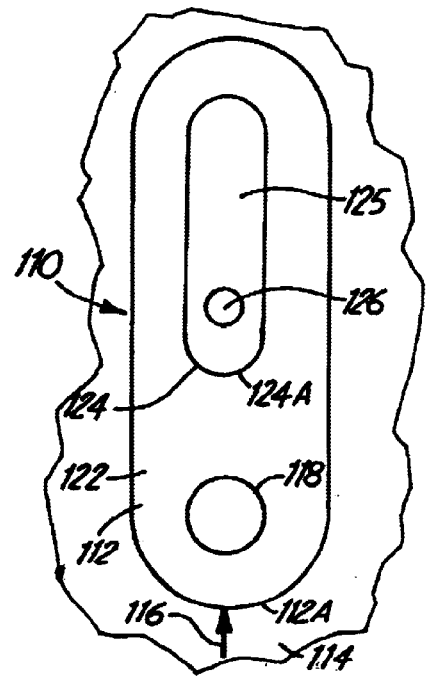
FIG. 7 is a side elevational view thereof taken generally along line 7—7 in FIG. 6.
Figure 8:
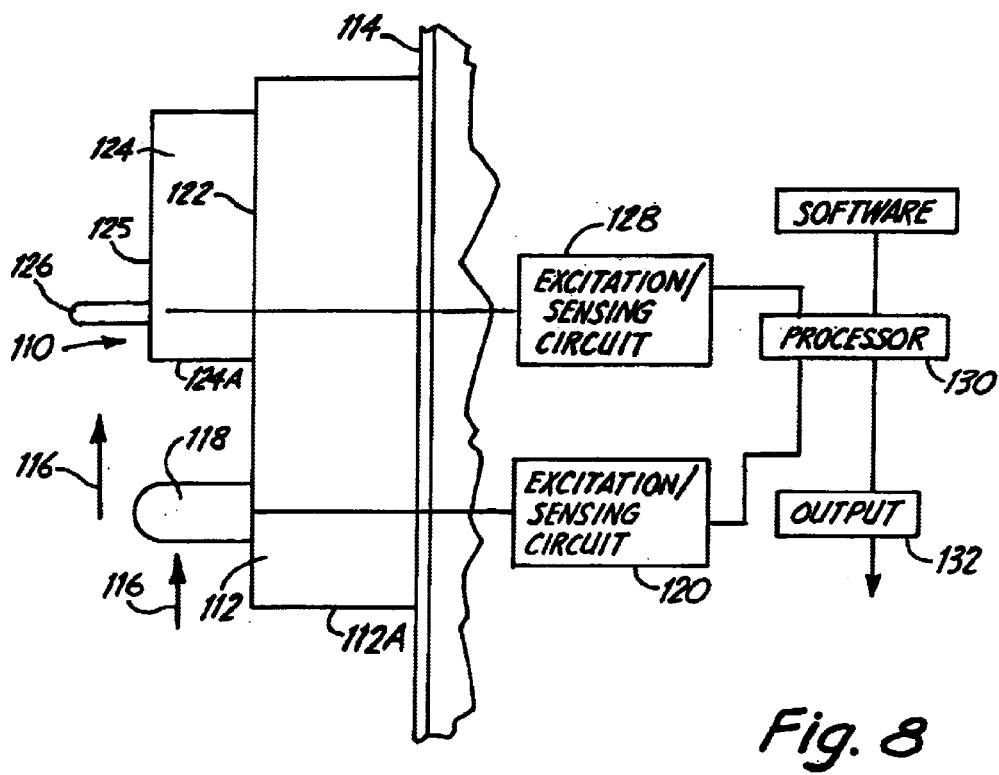
FIG. 8 is a top view of the ice detector of FIG. 6.

An ice detector 110 made according to a third variation of the present invention is shown in FIGS. 6, 7 and 8. The ice detector has a large strut 112 that is mounted onto the side of an aircraft and supported on the aircraft skin 114. The ice detector 110 protrudes into the air stream, which is flowing as indicated by the arrow 116. The strut 112 mounts a large transverse dimension or large diameter probe 118. Probe 118 is a magnetostrictive probe that will be excited to oscillate at its natural frequency, when driven by a suitable excitation/sensing circuit 120. The probe 118 is made of a suitable material, and can have deicing heaters if desired. Probe 118 is mounted on an outer end wall 122 of the strut 112, as shown, and adjacent to leading end 112A of the strut relative to airflow direction.

A second smaller strut 124 is mounted on the end wall 122 of the larger strut 112 to the rear of the leading end 112A of the large strut 112. The strut 124 extends laterally outwardly from wall 122. Second smaller strut 124 mounts a smaller transverse dimension or diameter probe 126 on the outer end wall 125 of the strut 124. Probe 126 projects into the air stream.

The strut 124 positions the probe 126 essentially out of any disrupted or turbulent airflow caused by the larger diameter probe 118. The probe 126 is also a magnetostrictive type probe, preferably, and it is excited to its natural frequency through an excitation and sensing circuit 128. The circuits 120 and 128, in addition to providing excitation for magnetostrictive vibration of the probes, are used for determining changes in frequency of vibration of the respective probes. As ice accretes on the probes, the natural frequency changes, and this change in frequency is sensed and provided as an output from the circuits 120 and 128. The outputs from circuits 120 and 128 are provided to a processor 130.

It should be noted that both of the struts 112 and 124 can be suitably shaped, generally as elongated ovals, but could be true airfoil shape or circular if desired. The leading ends 112A and 124A are rounded to provide for relatively streamlined airflow around them. The probes 18 and 26 are in the airflow, so that any supercooled water droplets, regardless of size, will impinge on both of the probes.

However, since the probes have different lateral dimensions or diameters, they will have different ice collection efficiencies. For small droplet size the collection efficiency of the smaller diameter probe 126 will be higher than the larger diameter probe 118. As the supercooled water droplet size increases the collection efficiency of both probes will increase, but the larger diameter probe 18 will have its collection efficiency rise much faster. The amount of ice that accumulates on a probe is directly related to the collection efficiency of the probe, so that as the droplet size increases, the difference in the ice accretion or the ice accumulation rates on the two probes will decrease.

The collection efficiency is dependent upon the inertia of the droplets, probe diameter, and air velocity. The efficiency can be described as follows (from LANGMUIR AND BLODGETT, 1974):

EXAMPLE d=15 micron; D=0.25"
$V_{TAS}$=120 knots E=0.8202
$V_{TAS}$=250 knots E=0.8862
d=115 micron; D=0.25"
$V_{TAS}$=120 knots E=0.9914
$V_{TAS}$=250 knots E=0.9941
d=15 micron; D=1.0"
$V_{TAS}$=120 knots E=0.5328
$V_{TAS}$=250 knots E=0.6607
d=115 micron; D=1.0"
$V_{TAS}$=120 knots E=0.9665
$V_{TAS}$=250 knots E=0.9768
E=K/(K+He)
Where
$K=\rho w V_{TAS} d^2/(9_\mu D)$
Where
He=Fn ($Re_d$)
Where
$Re_d = \rho V_{TAS} d/\mu$ With the following definitions:
E is the collection efficiency (unitless)
K is the inertia parameter (unitless)
$Re_d$ is the droplet Reynolds # (unitless)
$V_{TAS}$ is the true airspeed (meters/sec)
d is the droplet diameter (meters)
$\mu$ is the dynamic viscosity of air (Kg/(sec meter)
D is the cylinder diameter (meter)
$\rho w$ is the density of water (Kg/m$^3$)
$\rho$ is the density of air (Kg/m3)

The two probes 118 and 126 are made so that they have similar thermodynamic properties which will prevent variations in the probe surface temperatures as ambient temperatures or other environmental conditions change. The probes are made to have similar mass and thermal capacity even though they are different size. As shown, the lengths of the probes extending from the respective struts are substantially equal.

The circuits 120 and 128 provide an indication of the ice that is accumulating or has accumulated on each of the probes. This information can be provided to processor 130, which will monitor the rate at which the ice accumulates on the probes as well as the total amount of ice accretion. The rate of change of frequency is an indication of the rate of ice accumulation, and the sensed frequency is an indication of the total amount of ice accretion. This information can be provided as an output 132 to the flight crew, or the output can be used for activating automatic systems for the deicing equipment. Also, the output can be calibrated so that it will classify the rate of icing as either light, moderate or severe for a particular aircraft. The indications can be different for each model of aircraft, and can be determined by wind tunnel tests.

Thus, by utilizing an ice detector that has dual probes, of substantially similar mass, but different cross sectional size or frontal size presented to the airflow, information relating to the types of icing can be obtained easily, and the information about rate of icing or icing severity also can be obtained. Comparison of the rates of icing on the two probes will indicate presence of large supercooled water droplets. The ice detector can be used with known excitation and sensing circuitry, as well as known processor software for obtaining the outputs that are desired.

Figure 9:
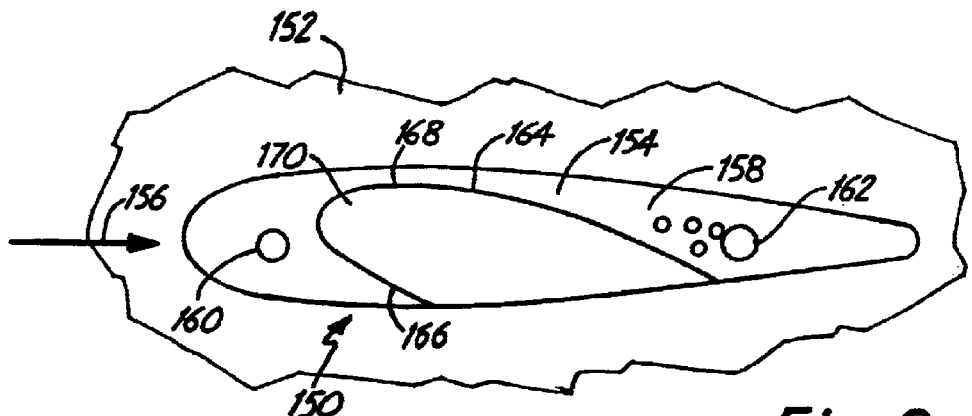
FIG. 9 is a top plan view of a fourth form of the invention utilizing an airfoil shaped airflow deflector between two ice detector probes.
Figure 10:
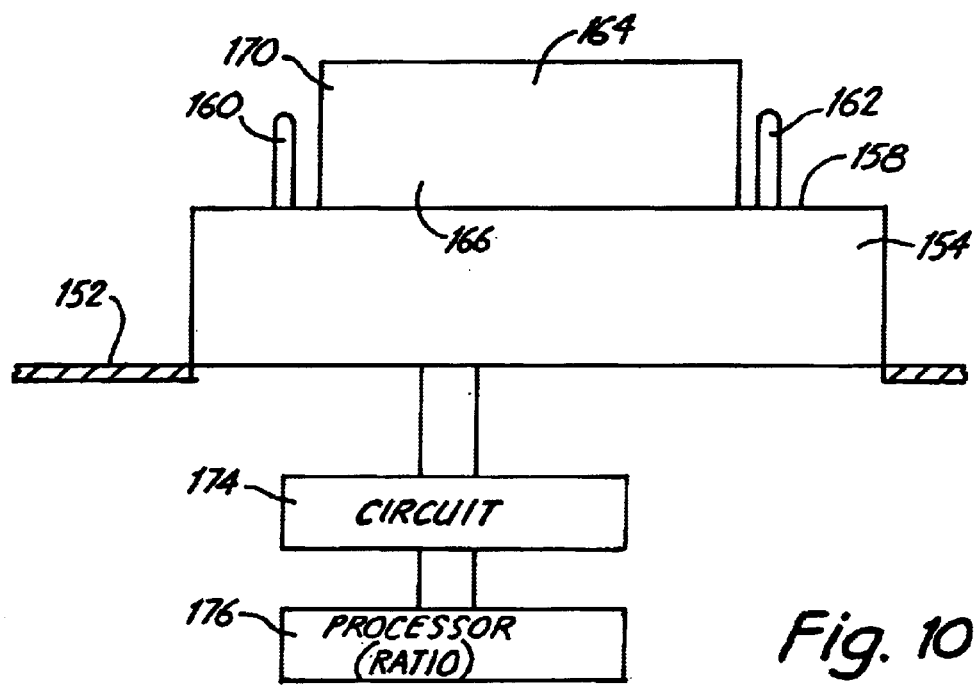
FIG. 10 is a side elevational view of the ice detector system of FIG. 9.

Referring to FIGS. 9 and 10, an ice detector 150 is mounted onto the side wall skin 152 of an aircraft. The ice detector in this form of the invention has an airfoil shaped strut 154 that protrudes from the aircraft skin, and as shown the leading end is rounded. The airflow direction is indicated by the arrow 156. The strut 154 can be relatively short in axial length, that is in the direction of protrusion from the aircraft skin. The strut has a top wall 158 that is substantially planar and mounts a leading ice detector probe 160 and a trailing ice detector probe 162. Probes 160 and 162 both are generally cylindrical probes that can be of known design utilizing measurements of frequency change for determining when ice is accumulating on the vibrating probe. The probes are separated from each other in flow direction, and between the probes there is a flow deflector 164 which is generally airfoil shaped. The flow deflector 164 has a pressure side 166 and a flow guide side 168. The probe 160 is positioned so that the flow around the airfoil shaped flow guide 164 is substantially laminar. The flow guide 164 provides for a smooth flow of particles, both large and small, around the leading end 170 of the airfoil shaped flow guide 164.

The small particles or droplets with less inertia will tend to remain close to the airfoil shaped guide as they reach the trailing side, but the larger particles will tend to separate because of their inertia, and will strike the trailing probe 162. Thus, when there are large super cooled droplets in the airflow, the change of icing rates between the two probes will indicate when the larger super cooled water droplets increase in number or density, because the trailing probe 162 will show a greater rate of accumulation of ice when larger drops are present.

As can be seen in FIG. 10, a circuit 174 can be used for determining the change of frequency of each of the probes, 160 and 162 individually, and then a processor 176 can receive these signals and can calculate the ratio of icing between the two probes to determine the presence of super cooled water droplets. This circuitry is known as is the same as that used with the other forms of the invention.

The concept of the present invention is to provide a pair of probes, one of which is an ice detecting probe that provides an indication of icing from all sizes of water droplets in the airflow, and a second probe in which the airflow around the probe is altered such that the trajectory of droplets is modified to bias the second probe to collect supercooled large droplets. The supercooled large droplets have greater inertia and account for a greater percentage of the ice mass accumulating on the second probe than on the first probe.

This can be done, as shown, by having one probe substantially larger, or causing the smaller droplets to follow flow around an air dam, or concentrating the supercooled large droplets by using flow guides. Inertia, causes a greater percentage of ice on one probe to be formed by large droplets.

Stated another way, the pair of probes are constructed or oriented so that the ice collecting on a second of the probes is formed by a greater percentage of the supercooled water droplets than the first probe. The first probe is in the free standing or free stream region.

Even though the second form of the invention shows that the first probe is in the inlet portion of a constricting flow, the air stream that is hitting the probe is substantially a free stream airflow because the inertial effects of the flow along the converging walls that causes the supercooled large droplets to concentrate just aft of the junction of the narrow channel 70 and the converging walls 62. In fact, the first probe could be located in the free stream air outside of the duct.

The term "large" droplet again is defined as a droplet that is 50 microns in diameter or greater. Droplets that are smaller than 50 microns in diameter are small droplets.

Although the present invention has been described with reference to preferred embodiments, workers skilled in the art will recognize that changes may be made in form and detail without departing from the spirit and scope of the invention.

What is claimed is:

1. An ice detector for determining the presence of supercooled large droplet icing conditions and the severity of icing conditions comprising a pair of probes mounted to project into in an air stream, each of the probes having an upstream facing surface being subjected to airflow, one of the probes having a substantially larger dimension transverse to the airflow than the other probe.

2. The ice detector of claim 1, wherein the probes are constructed to have similar thermal capacity.

3. The ice detector of claim 2, and a circuit connected to each of the probes to determine ice accumulation on the probes.

4. The ice detector of claim 3, and a processor for determining a rate of ice accretion on each of the probes, and for determining differences in the rates of ice accretion on the respective probes.

5. The ice detector of claim 4, including an output from the processor that indicates severity of icing and the presence of supercooled large droplet icing conditions as a function of the signals from the sensing circuits.

6. An ice detector assembly supported in a fluid stream carrying supercooled water droplets, the supercooled water droplets ranging in size and including droplets that are large droplets, comprising a first ice detector probe having an upstream facing surface in a position to collect a range of small and large supercooled water droplets, and a second ice detector probe having an upstream facing surface and configured with portions of the ice detector assembly such that as the number of large droplets in the airflow increases, the rate of ice accretion on the second probe increases relative to rate of ice accretion the first probe.

7. The ice detector assembly of claim 6, and a circuit connected to each of the ice detector probes for providing an indication of icing on the probes, including a signal indicating a rate of collection of ice on the respective ice detector probe, and the circuit indicating a ratio of the rate of collection of ice between the first and second ice detector probes to indicate the presence of large supercooled droplets in the fluid stream.

8. The ice detector assembly of claim 6, wherein the second ice detector probe is configured with the ice detector assembly to include an upstream facing surface having a dimension transverse to the direction of airflow substantially greater than the first ice detector probe.

9. An ice detector assembly, supported in a fluid stream carrying supercooled water droplets, the supercooled water droplets ranging in size and including droplets that are small and large droplets, comprising a first ice detector probe mounted in a position to collect a range of small and large supercooled water droplets, a second ice detector probe mounted such that as the number of large droplets in the airflow increases, the rate of ice accretion on the second probe increases relative to the rate of ice accretion on the first probe, the ice detector assembly including a flow guide that causes inertial separation of large particles from the air flow, wherein the second ice detector probe is configured to be adjacent the flow guide that causes the inertial separation.

10. The ice detector assembly of claim 9, wherein the flow guide comprises a wall to intercept flow of the fluid stream and affecting the movement of droplets such that large droplets are biased to engage the second ice detector probe.

11. An ice detector assembly supported in a fluid stream carrying supercooled water droplets and flowing relative to the ice detector assembly, the supercooled water droplets ranging in size and including droplets that are larger than other droplets, comprising a first ice detector probe mounted on the ice detector assembly in substantially free stream conditions, a flow guide on the ice detector assembly, a second ice detector probe mounted on the ice detector assembly and associated with the flow guide such that the flow guide separates small droplets from the fluid stream striking the second ice detector probe without substantially affecting small droplets in the fluid striking the first ice detector probe.

12. The ice detector assembly of claim 11, wherein the flow guide comprises a wall to intercept flow of the fluid stream and positioned adjacent to the second ice detector probe, the wall affecting the movement of droplets such that smaller droplets more so than larger droplets are carried past the second ice detector probe without impinging the second probe.

13. The ice detector assembly of claim 11, wherein said flow guide comprises a duct that contracts in a fluid flow direction, the contraction of the duct being directed toward the second ice detector probe, the second ice detector probe being positioned downstream of a downstream end of the contraction, said first ice detector probe being spaced sufficiently from the downstream end of said contraction to be substantially unaffected by the fluid flow exiting the downstream end of the contraction.

14. The ice detector assembly of claim 11, wherein said flow guide comprises an air dam with a wall transverse to a fluid flow direction past the ice detector probes, and said air dam being positioned adjacent to and downstream of the second ice detector probe and causing a fluid flow direction change so smaller droplets follow fluid flow around the second ice detector probe more so than larger droplets.

15. The ice detector assembly of claim 11, wherein said flow guide comprises a flow channel having an inlet of a first cross sectional size, guide walls converging toward a second portion of the flow channel that is of a second cross sectional size smaller than the first cross sectional size, said guide walls contracting in a downstream flow direction, and said second probe being positioned in the second portion of the flow channel in a region of the path where large droplets moving along the converging walls concentrate.

16. The ice detector assembly of claim 15, wherein said guide walls have openings therein for bleeding off a boundary layer on the converging walls.

17. The ice detector assembly of claim 15, wherein said guide walls have heaters thereon for deicing the guide walls.

18. The ice detector assembly of claim 14 further comprising heaters mounted on the air dam.

19. The ice detector of claim 11 further comprising a circuit connected to each of the ice detector probes for providing an indication of icing on the ice detection probes including determining a rate of icing on the ice detector probes, and providing a ratio of the rate of icing between the first and second ice detector probes as an indication of the presence of large supercooled droplets in the fluid stream.

20. The ice detector assembly of claim 11 wherein the flow guide is airfoil shaped in cross section.

21. The ice detector assembly of claim 20 wherein the probes and airflow guide protrude from a mounting surface, the airflow guide protruding farther than the probes.

22. An ice detector assembly comprising a support in a fluid stream, a pair of ice detector probes mounted on said support, said ice detector probes having curved upstream facing wall portions and extending generally parallel to each other outwardly from a surface into the fluid stream, one of said ice detector probes being configured as part of the ice detector assembly such that large droplets of supercooled water impinging on said one of said ice detector probes form a greater portion of total supercooled droplets impinging on the one probe than the portion of large supercooled liquid droplets of total supercooled droplets impinging on the other of said ice detector probes.

23. The ice detector assembly of claim 22, wherein the configuration of the one ice detector probe includes a flow guide for directing the fluid stream in a path that inertially separates large droplets from small droplets.

24. The ice detector assembly of claim 23, wherein the flow guide comprises an air dam positioned downstream from said one of said ice detector probes.

25. The ice detector assembly of claim 23, wherein said flow guide comprises a wall upstream of said one of said ice detector probes, said wall being inclined relative to a fluid flow direction to direct flow in a general direction toward said one of said probes, and biasing larger droplets with greater inertia to be directed toward said one of said ice detector probes.

26. The ice detector assembly of claim 22, wherein the one of said probes is configured to have a wider dimension transverse to the flow direction than the other of said probes.

27. The ice detector assembly of claim 26, wherein the ice detector probes have substantially the same thermal capacity.

28. The ice detector assembly of claim 26, wherein the ice detector probes have curved convex surfaces facing in the direction of relative fluid flow.

29. The ice detector assembly of claim 28, wherein the probes are both circular cylinders.

30. The ice detector assembly of claim 23, wherein said flow guide comprises a duct for carrying fluid flow, said duct having an inlet portion, said duct converging from an upstream end of said inlet portion toward a narrow flow channel, the other of said ice detector probes being mounted in said inlet portion, and said one of said ice detector probes being mounted in said narrow flow channel adjacent a transition region between the converging duct and generally uniform cross sectional portions of said narrow flow channel.

31. The ice detector assembly of claim 30, wherein said converging duct comprises a pair of converging walls curved downstream of the inlet and upstream of the narrow flow channel for aerodynamic smoothing, thereby directing higher inertia droplets in the fluid flow stream to concentrate downstream of the transition region, said one of said ice detector probes being mounted in the duct where the higher inertia droplets concentrate.

32. The ice detector assembly of claim 22, further comprising separate circuits for determining changes in frequency of each of said ice detector probes, and a processor for comparing the rate of change of frequency between the ice detector probes as an indication of large droplets being collected on said one of said ice detector probes.

33. The method of claim 31 including configuring one of the probes to have a wider dimension transverse to a relative airflow direction than the other of the probes.

34. A method of determining the presence of large supercooled water droplets in an airflow having supercooled water droplets of a range of sizes, the supercooled droplets causing ice accretion on surfaces on which the supercooled droplets impinge, the method comprising providing two ice detector probes, configuring one of the probes such that inertial separation of droplets in the fluid causes a greater proportion of large supercooled droplets to impinge on one of the probes than the proportion of large supercooled water droplets impinging on the other probe relative to total supercooled droplets in the airflow, and determining the ratio of the rate of change of ice accretion on the two ice detector probes to detect the presence of large supercooled water droplets in the airflow.

35. The method of claim 34 including providing a flow guide for causing inertial separation of small supercooled water droplets from the flow impinging on the one probe.

* * * * *